June 17, 1969     J. MOSETICH     3,450,255
BUNDLE OR PACKAGE OF FASTENERS
Filed March 8, 1968
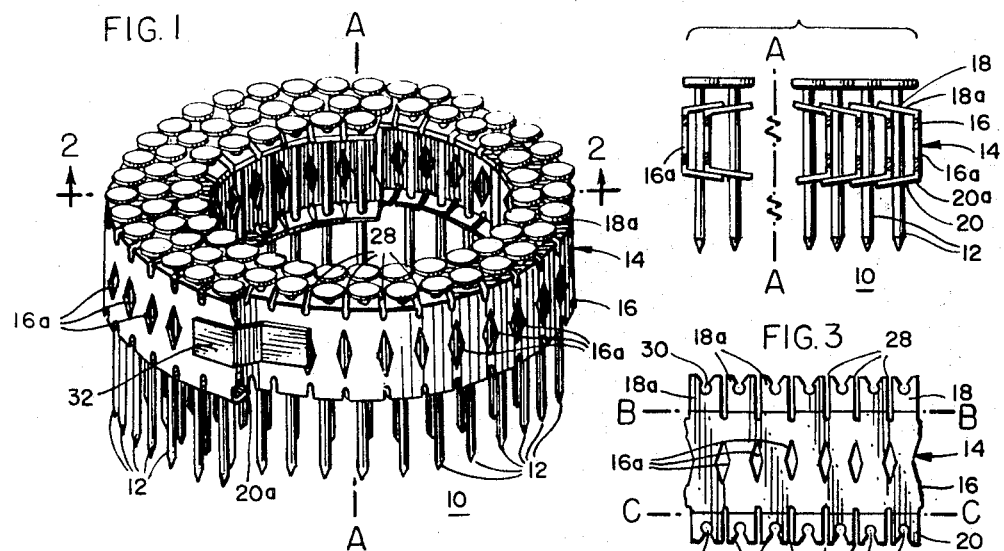
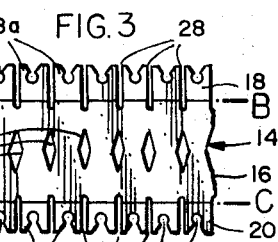
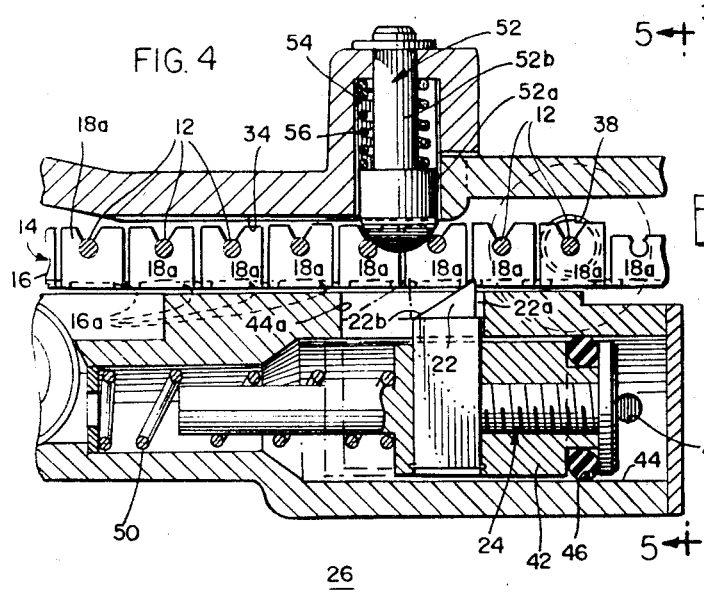
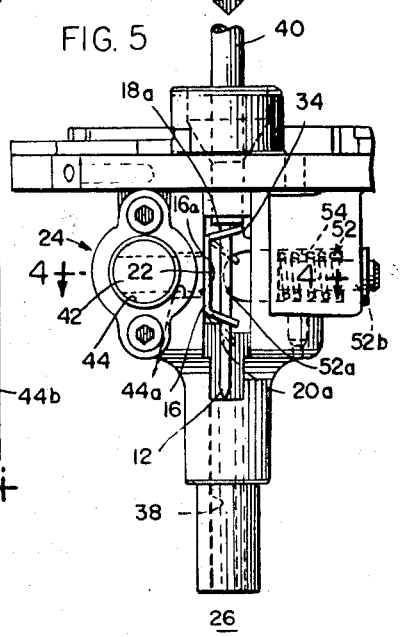
INVENTOR:
JOSEPH MOSETICH,
BY: *Mason, Kolehmainen, Rathburn Wyss*
ATT'YS

United States Patent Office 3,450,255
Patented June 17, 1969

3,450,255
BUNDLE OR PACKAGE OF FASTENERS
Joseph Mosetich, Westchester, Ill., assignor to Fastener Corporation, Franklin Park, Ill., a corporation of Illinois
Filed Mar. 8, 1968, Ser. No. 711,586
Int. Cl. B65d 71/04
U.S. Cl. 206—56          10 Claims

ABSTRACT OF THE DISCLOSURE

A bundle or package of fasteners comprising a plurality of fasteners and a coiled carrier for holding the fasteners in a compact bundle with their shanks in spaced parallel relation. The carrier comprises an elongated web of flexible material coiled around a central coiling axis parallel and inwardly of said fastener shanks. First and second lines of shank-holding tabs are integrally and hingedly connected to the opposite longitudinal edges of said web and each of said tabs includes a fastener shank-receiving opening. The tabs are angularly disposed with respect to said web and extend toward said coiling axis with each fastener shank extending through an opening in a pair of supporting tabs, one on each edge of the web. The fasteners are spaced between a portion of the web connected to the adjacent pair of supporting tabs and the coiling axis, and removable means are provided for holding said carrier in coiled condition to form a compact bundle with a large number of fasteners therein suitable for easy insertion into the magazine of a driving tool.

---

The present invention relates to a new and improved bundle or assemblage of fasteners and, more particularly, relates to a new and improved bundle of fasteners wherein a large number of fasteners are supported in spaced parallel relation on a continuous, elongated, flexible carrier which is tightly coiled to form a compact bundle. The new and improved bundle of fasteners in accordance with the invention is especially adapted for use in fastener driving tools which are capable of driving large fasteners, such as common nails and the like and presents many advantages over prior types and arrangements of fasteners in packages or bundles.

With the advent of power actuated fastener driving tools of the pneumatic or electric type which are capable of driving relatively large fasteners, such as common nails and the like, new and improved means are needed for holding a large supply of fasteners mounted on a continuous flexible strip coiled into a compact bundle which can be easily handled and inserted into a tool magazine. A carrier strip suitable for holding large fasteners such as common nails and the like is shown and described in the copending United States Patent application Ser. No. 637,510, filed May 10, 1967 and assigned to the same assignee as the present invention. Prior packages or bundles of fasteners have been excessively large and bulky even though only a limited number of fasteners are contained in each bundle, and, in addition, many prior arrangements have been unsatisfactory because of the fact that during handling, storage and insertion of the bundles into the magazine of a tool the fasteners frequently become separated or dislodged from the carrier strip supporting them.

In trying to correct the latter difficulty by providing better means for more securely holding the nails in a bundle, another problem has been encountered and that is the fact that in many instances, because of the more secure holding arrangement it has been difficult for the driver of a tool to remove the nail from the strip during a power stroke, and this causes frequent jamups of fasteners in the drive track. When the last few nails remaining in a strip or bundle are driven, the carrier strip being constructed to securely hold the nails often tends to cock in the magazine guideway and this in turn often causes jam or hangups of the fasteners in the drive track or magazine of the tool.

Accordingly, it is an object of the present invention to provide a new and improved bundle or package of fasteners suited for use in fastener driving tools.

More specifically, it is an object of the present invention to provide a new and improved bundle or package of fasteners which eliminates all or many of the aforementioned difficulties present in prior arrangements.

Yet another object of the present invention is to provide a new and improved bundle or package of fasteners holding a larger number of relatively large fasteners, yet being no larger in size or weight than prior bundles.

Still another object of the present invention is the provision of a new and improved package or bundle of fasteners which is easy to handle and yet does not permit the fasteners to become easily separated or dislodged from the carrier strip during handling, storage or loading into the magazine of a tool.

Yet another object of the present invention is the provision of a new and improved bundle or package of fasteners in which the nails are more securely held in the package or bundle and yet are still easily released in the tool by action of the driver during a power stroke.

Still another object of the present invention is the provision of a new and improved bundle or package of fasteners which is compact in size and easily handled and which can be easily loaded into the tool magazine.

Still another object of the present invention is the provision of a new and improved bundle of fasteners in which the fasteners are carried on a tightly coiled carrier strip which is maintained in tightly coiled configuration yet does not require means directly engaging the fasteners themselves for preserving the tightly coiled package or bundle.

The foregoing and other objects and advantages of the present invention are accomplished by a new and improved bundle or assemblage of fasteners for use in fastener driving tools and the like comprising a plurality of fasteners and an elongated, flexible carrier strip of channel-shaped cross section for supporting the individual fasteners and holding them in a compact bundle. The carrier strip is wound in a tightly coiled configuration and includes a web and flange portions formed along opposite edges of the web. Each flange comprises a plurality of fastener-holding integral hinge tabs and the shank of each fastener is supported in a pair of hinge tabs on opposite edges of the webs so that when a driving stroke of the tool is initiated the tabs are deflected downwardly and easily release the fasteners for driving into a workpiece with a minimum of opportunity for jamming or wedging the fasteners in the drive track of the tool because of misalignment. The carrier strip is coiled so that the fasteners are positioned inwardly of the web toward the center of the coiling axis, and the fasteners are then protected by the web so that they may not indavertently become separated or dislodged from the bundle during handling, storage or insertion of the bundle into a driving tool.

For a better understanding of the present invention, reference should be had to the following detailed description in which:

FIG. 1 is a perspective view of a new and improved bundle or package containing a large number of fasteners and constructed in accordance with the present invention;

FIG. 2 is a fragmentary sectional view taken substantially along the line 2—2 through the bundle illustrated in FIG. 1 and coincident with the coiling axis A—A thereof;

FIG. 3 is a plan view of the flexible carrier strip after it is fabricated to shape but before it is formed into a channel shaped cross section prior to insertion of the nails therein and prior to coiling of the nail strip into a compact bundle;

FIG. 4 is a horizontal, longitudinal cross-sectional view taken through a fastener driving tool suitable for handling nails in a bundle or package constructed in accordance with the invention; and FIG. 5 is a transverse cross-sectional view of the tool of FIG. 4, taken substantially along the line 5—5 of FIG. 4.

Referring now more particularly to the drawings, therein is illustrated a new and improved bundle or package of fasteners in accordance with the present invention and referred to generally by the reference numeral 10. The bundle or package of fasteners 10 comprises a large number of individual fasteners 12, such as common nails or the like, and the nails 12 are supported on a spirally coiled carrier strip 14 having a web portion 16 and a pair of flange portions 18 and 20 along opposite edges comprising a plurality of longitudinally spaced, integrally hinged tabs 18a and 20a.

FIG. 3 illustrates the carrier strip 14 as it is initially cut or stamped to shape from a continuous ribbon of flexible plastic material, such as polyethylene or the like. The web portion 16 is formed with a plurality of longitudinally spaced apart, centrally located, diamond-shaped perforations 16a which are adapted to receive the outer end portion of a reciprocally movable pawl 22 of a nail feeding assembly 24 of a driving tool 26. The hinge tabs 18a and 20a, formed along opposite longitudinal edges of the web portion 16 of the carrier strip, are spaced from one another and to this end the side edges of adjacent tabs are formed transverse by slots or openings 28 which extend inwardly a short distance into the body portion of the web 16. The axes of the slots between pairs of tabs 18a and 20a on opposite edges of the web portion 16 are aligned with the major axes of the diamond-shaped slots 16a formed in the web and each hinge tab 18a and 20a is formed with a keyhole shaped slot or opening 30 therein adapted to receive and hold the shank of a fastener 12 inserted therein. The openings 30 open onto the outer edges or free ends of the respective tabs 18a and 20a and after the carrier strip is initially cut or stamped out, as shown in FIG. 3, the hinge tabs 18a and 20a along opposite edges of the web are bent or deflected at their inner portions along the axes B—B and C—C (FIG. 3) to form the carrier into a generally channel shaped configuration (FIG. 2).

Bending of the tabs 18a and 20a along the axes B—B and C—C is aided by cutting or scribing the strip material along the respective bend lines B—B and C—C so that once the tabs 18a and 20a are deflected to form the channel-shaped configuration shown in FIG 2, the tabs remain in the deflected position for receiving the shanks of the fasteners 12 which are inserted downwardly through the keyhole openings 30 therein.

After insertion of the nails has been completed, the strip is cut into appropriate lengths; for example, each strip may hold 400 nails and the cut lengths are then coiled about a coiling axes A—A (FIG. 1), forming a tight, compact bundle of fasteners 10 as therein shown.

Because of the slots 28 or spacing between the edges of adjacent hinge tabs 18a and 20a, the carrier strip can be tightly coiled in the direction shown in FIG. 1 with the outer ends of the tabs pointing inwardly towards the coiling axis A—A. The coiled strip thus forms a neat, compact bundle 10 holding a large number of nails and occupying a relatively small space.

When the strip is thus coiled, the web portion 16 is outwardly of the nails 12 held by each pair of tabs 18a and 20a immediately adjacent thereto and the web offers protection for the nails and prevents them from being inadvertently dislodged or separated from the carrier during handling, storage, or insertion of the fastener bundle into the magazine of a tool. When the carrier strip 14 is tightly coiled to form the compact bundle, the shanks of the nails in the outer convolutions of the strip bear inwardly against the outside surface of the web 16 on the inward convolution as best shown in FIG. 2 and each pair of tabs 18a and 20a overlaps the tabs on the next inward convolution of the carrier strip in a nested arrangement.

It has been found that if a strip of the configuration shown is coiled in a reverse direction with the tabs 18a and 20a extending outwardly, the number of nails which can be held in a bundle of a given diameter is considerably less than when the carrier strip is coiled in a reverse direction with the free ends of the hinge tabs extending inwardly as shown. Moreover, the chances of nails becoming dislodged or separated from the strip are greatly reduced and the bundles are much easier to handle. The web portion 16 on the outer convolution of the bundle prevents the nails from being easily dislodged from the bundle during handling, storage or insertion of the bundle into a magazine.

The carrier strip is maintained in a tightly coiled configuration as shown in FIG. 1 by a short piece of adhesive material 32, such as tape or the like, which extends between the outer end of the carrier strip web portion 16 and the web of an adjacent inward convolution and does not come in contact with the nails 12. The tape 32 is readily removable after the bundle 10 has been inserted into the magazine of a tool, and the leading or outer end of the carrier strip is then easily fed or inserted into the guideway 34 of a fastener driving tool as shown in FIG. 4.

FIG. 4 illustrates a fastener driving tool 26 which is adapted to drive nails 12 which are supplied from a bundle or package 10 constructed in accordance with the present invention and only the lower end of the nosepiece of the tool and a short portion of the magazine are shown. A bundle 10 of fasteners is placed in the magazine of the tool which is rearwardly of the nosepiece and the short piece of binding tape 32 is then removed from the web. The leading or outer free end of the carrier strip is advanced forwardly from the magazine along the guideway 34 until the first nail in the strip is in line or centered within a vertically disposed drive track 38 formed in the nosepiece. A driver or driving rod 40 is slidably mounted in the drive track for driving the nails into a workpiece positioned below the nosepiece, and as each nail held in the carrier strip is driven by a downward stroke of the driver, the pair of hinge tabs 18a and 20a holding the nail are pivoted downwardly, as shown in phantom in FIG. 5, to release the nail. The tabs hold the nail in centered position in the drive track during the initial portion of the downward driving stroke of the driver and the possibility of a nail becoming cocked or wedged in the drive track is thereby reduced.

Afer a drive stroke has been completed and the driver is moved upwardly out of the drive track on a return stroke, the carrier strip is advanced forwardly (from left to right in FIG. 4) to move in the next nail in the strip into a centered position in the drive track 38.

In order to advance the strip of nails forwardly along the guideway 34 into the drive track, the feeding assembly 24 includes a piston member 42 which is slidable in a bore 44, axially parallel with but laterally offset from the guideway 34. The feeding pawl 22 is mounted to extend laterally from one side of the piston member 42 and the feed pawl includes a leading edge 22a normal to the web 16 of the strip in the guideway 34. The pawl is slidable forwardly and rearwardly along a slot 44a formed on the inside wall of the guideway in communication with the bore 44 and includes a rearwardly and outwardly tapered back face or cam surface 22b which permits the pawl member 22 to move rearwardly while the strip is stationary. The pawl surface 22b deflects the web momentarily toward the center of the guideway 34 during a rearward stroke of the pawl until the forward edge of the pawl 22a is rearward of the next diamond-shaped slot 16a in the carrier. The web 16 then deflects back to its normal condition with the tip portion of the pawl seated in the slot in the web in preparation for the next forward or feeding stroke of the piston 42. Because the carrier strip 14 is fabricated of flexible material, the web 16 is easily deflected during rearward travel of the pawl 22 and complicated pawl pivoting and driving mechanisms are not required. The forward end of the piston 42 is provided with an O-ring 46 which seals against the surface of the bore cylinder 44 so that the piston moves rearwardly upon the introduction of pressurized fluid into the forward or closed end of the bore via a port 44b. When the pressurized fluid in the forward end of the cylinder or bore 44 is reduced, a compression spring 50 mounted in the rearward open end of the bore or cylinder biases the piston and feed pawl forwardly on a feeding stroke, thereby advancing another nail 12 into centered position in the drive track 38. Feeding and return strokes of the piston 42 are controlled in synchronism with the power and return strokes of the driver 40 so that on each cycle of the driver another nail 12 is advanced into the drive track 38.

In order to prevent the nail strip from moving rearwardly in the guideway 34 when the pawl member 22 on the piston moves on a return stroke, the tool is provided with a backup pawl assembly 52 comprising a laterally disposed plunger having a rounded head 52a and an outwardly extending stem 52b of reduced diameter. The plunger is disposed for axial movement within a laterally extending bore 54 in communication with the guideway 34 opposite the feed pawl 22. A spring 56 is seated in the bore 54 to normally bias the plunger head 52a against and between pairs of nails 12 to hold the strip with the leading nail therein properly positioned in the drive track. The curved head of portion 52a engages the nail shanks directly and normally prevents longitudinal movement of the carrier strip in the guideway as the feeding pawl 22 moves rearwardly on a return stroke. On each operating cycle of the piston 42, the carrier strip is advanced forwardly until the nail engaged by the rearward surface of the plunger head 52a is then engaged by the forward portion or surface thereof. The backup pawl assembly 52 then firmly holds the carrier strip in the guideway and normally prevents rearward movement of the strip by the feed pawl 22. The back up pawl biasing spring 54 is selected so that excessive force is not required to advance the carrier strip on a feeding stroke of the piston 42 and the strip can be removed from either end of the guideway 34 by pulling on the web 16 with sufficient force to move the nails by the plunger head 52a.

From the foregoing description it will be seen that the new and improved bundle or package of fasteners provides many advantages over the prior art, and it is intended in the claims to cover all those modifications which would occur to one skilled in the art.

What is claimed and desired to be secured by Letters Patent of the United States is:

1. A bundle of fasteners comprising in combination, a plurality of fasteners having elongated shanks and a carrier for holding said fasteners in said bundle with their shanks in spaced-apart, parallel relation, said carrier comprising an elongated web of flexible material coiled around a central coiling axis parallel and inwardly of said shanks and first and second lines of spaced apart tabs hingedly connected to respective longitudinal edges of said web, each of said tabs having a fastener-receiving opening therein and being angularly disposed with respect to said web to extend toward said central coiling axis, each fastener shank extending through openings in a pair of supporting tabs, one on each line, and spaced between a portion of said web connected to said pair of supporting tabs and said coiling axis, and removable means for holding said web in coiled condition forming said bundle of fasteners.

2. The combination of claim 1 wherein the shank of each fastener extends through the opening in a pair of tabs on the first and second lines and is thereby held in parallel relation with the inside coiled surface of the adjacent web.

3. The combination of claim 1 wherein said removable means comprises tape means for holding said web in coiled condition, said tape means being free of engagement with any fastener shanks and applied to the outer free end of said web and a portion of said web adjacent thereto inwardly of said free end toward said coiling axis.

4. The combination of claim 1 wherein adjacent tabs along each longitudinal edge of said web include side edges spaced apart for permitting tight spiral coiling of said web without interference between the edges of adjacent tabs.

5. The combination of claim 1 wherein said web is specially coiled with the fastener shanks supported from outer portions of the web bearing against the outer surface of adjacent inner portions of the web toward said coiling axis.

6. An assemblage of fasteners for use in a fastener driving tool comprising a plurality of fasteners, an elongated, flexible carrier strip of channel-shaped cross section including a web and flange portions along opposite edges of said web comprising a plurality of fastener holding, hinge tabs, and means for holding said carrier in coiled relation with said hinge tabs pointing inwardly toward a common coil axis.

7. The assemblage of claim 7 wherein said last mentioned means comprises removable tape means interconnecting the outer end of said web and the next adjacent inner convolution thereof.

8. The assemblage of claim 6 wherein said hinge tabs are spaced apart longitudinally along said carrier, thereby permitting said web to be coiled more tightly in the direction of said tabs.

9. The assemblage of claim 8 wherein each of said tabs is formed with a fastener receiving opening therein in communication with the free outer end of the tab.

10. The assemblage of claim 9 wherein each fastener is supported by a pair of hinge tabs, one on each edge of said web, and in parallel with the next adjacent fastener inwardly of said web.

References Cited

UNITED STATES PATENTS 2,582,476    1/1952    Buttery.
2,681,702    6/1954    Kuenn et al.

JOSEPH R. LECLAIR, *Primary Examiner.*

J. M. CASKIE, *Assistant Examiner.*